(12) United States Patent
Steppat et al.

(10) Patent No.: US 10,281,354 B2
(45) Date of Patent: May 7, 2019

(54) TEST BENCH FOR CHARGING DEVICES

(71) Applicant: BorgWarner Inc., Auburn Hills, MI (US)

(72) Inventors: Harald Steppat, Oberwesel (DE); Michael Mandel, Viernheim (DE); Stefan Birkenhagen, Bockenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/738,630

(22) PCT Filed: Jun. 30, 2016

(86) PCT No.: PCT/US2016/040247
§ 371 (c)(1),
(2) Date: Dec. 21, 2017

(87) PCT Pub. No.: WO2017/004298
PCT Pub. Date: Jan. 5, 2017

(65) Prior Publication Data
US 2018/0180506 A1    Jun. 28, 2018

(30) Foreign Application Priority Data

Jun. 30, 2015  (DE) .......... 10 2015 212 216

(51) Int. Cl.
*G01L 5/00* (2006.01)
*G01L 1/00* (2006.01)
(Continued)

(52) U.S. Cl.
CPC ............. *G01L 25/003* (2013.01); *G01L 1/00* (2013.01); *G01L 3/00* (2013.01); *G01L 5/0009* (2013.01);
(Continued)

(58) Field of Classification Search
CPC . G01L 25/003; G01L 1/00; G01L 3/00; G01L 5/0028; G01L 5/0009; G01L 5/12; G01M 13/04; G01M 5/02; G01M 15/14
(Continued)

(56) References Cited

U.S. PATENT DOCUMENTS 4,065,956 A * 1/1978 Trattner ................ G01M 13/04
73/9
4,099,800 A * 7/1978 Bell ........................ B23Q 1/38
33/DIG. 2
(Continued)

FOREIGN PATENT DOCUMENTS

JP    2003328850 A    11/2003
JP    2004340760 A    12/2004
(Continued)

OTHER PUBLICATIONS

Written Opinion and International Search Report dated Sep. 12, 2016, in International Application No. PCT/US2016/040247.

*Primary Examiner* — Max H Noori
(74) *Attorney, Agent, or Firm* — Eric L. Doyle; Stephan A. Pendorf; Patent Central LLC

(57) ABSTRACT

A test bench for measuring forces and torques of rotatably mounted bodies in charging devices. The test bench has a rotatably mounted body of a charging device, a measuring component, and a bearing component for mounting the measuring component. The bearing component is configured in such a way that the measuring component is frictionlessly mounted in the bearing component.

18 Claims, 2 Drawing Sheets

(51) Int. Cl.
  *G01L 25/00* (2006.01)
  *G01L 3/00* (2006.01)
  *G01M 13/04* (2019.01)
  *G01M 15/02* (2006.01)
  *G01M 15/14* (2006.01)
  *G01L 5/12* (2006.01)

(52) U.S. Cl.
  CPC .............. *G01L 5/0028* (2013.01); *G01L 5/12* (2013.01); *G01M 13/04* (2013.01); *G01M 15/02* (2013.01); *G01M 15/14* (2013.01)

(58) Field of Classification Search
  USPC ...................................................... 73/862.08
  See application file for complete search history.

(56) References Cited

U.S. PATENT DOCUMENTS

| | | | |
|---|---|---|---|
| 4,694,689 A | 9/1987 | Kawasaki | |
| 2012/0279290 A1* | 11/2012 | Malone ................. | G01M 3/025 73/114.16 |
| 2014/0144221 A1* | 5/2014 | Malone ................. | G01M 3/025 73/114.77 |

FOREIGN PATENT DOCUMENTS

| | | |
|---|---|---|
| JP | 2013195122 A | 9/2013 |
| KR | 101248522 B1 | 4/2013 |

\* cited by examiner

TEST BENCH FOR CHARGING DEVICES

FIELD OF THE INVENTION

The present invention relates to a test bench for measuring forces and torques of rotatably mounted bodies in charging devices.

BACKGROUND OF THE INVENTION

Different frictional forces and thus frictional losses occur in the bearings according to rotational speed and axial load on the bearings with regard to rotatably mounted bodies. At very high rotational speeds, in particular, which occur in charging devices, for example, in turbochargers, such frictional losses are highly relevant. However, in addition to the forces which arise in the region of viscous friction in the so-called Stribeck curves, the losses, in particular, in the region of boundary friction and mixed friction downstream of the Stribeck, are important. The quality of the mounting depends, among other things, on the behavior of the mounting in the mixed friction region of the Stribeck curve. An exact measurement of the forces arising in this region is therefore desirable, as this would enable a better analysis and evaluation of the signs of wear of the bearing. For an analysis of this type, it is necessary that spatial positions (orbital path, axial movement of the rotating body) and also the frictional torque or the frictional power may be exactly measured or determined under actual conductions and if possible without disturbance variables.

In the industry, diverse test benches are known for measuring frictional power or friction torque (also known as friction power test benches). With regard to these known test benches, different approaches are followed to determine the frictional power and thus the power loss in charging devices.

For example, there are test benches in which the principle of direct frictional measurement is used. This means that the power supplied by a drive is compared with the power arriving at the test object. With regard to known friction power test benches, the operation of the shaft is carried out via a drive in the form of an electromotor, which is coupled to the shaft via coupling elements. Test benches of this type, however may generally realize rotational speeds of only 80,000 rpm, in many embodiments up to 125,000 rpm. This means that not all actual conditions, e.g. of a turbocharger, may be mapped, and the results must be extrapolated instead in order to analyze the rotational speeds possible in actual use of up to 300,000 rpm. In addition, in these test benches, the deviation of the power adjusted at the drive is compared with the power output at the measuring device, and thus the power loss is determined purely mathematically. Consequently, there is no direct measurement of the friction torque. The air friction generated and the mass inertia of the turbocharger rotor should thereby be considered. In order to avoid distortions in the results, these variables must be determined at the beginning of the test and calculated along with it. A further disadvantage is that only one specific, pre-selected axial load may be used for the measurement. In addition, the coupling at the electromotor influences the displacement path (orbital path) of the shaft.

A known alternative for determining the frictional power includes test benches, on which the measurement is carried out in the form of deceleration tests. An axial and a radial force are thereby applied, e.g. using nozzles. After the test object has been accelerated to a specific speed via a drive charger, it is decoupled from the same, and the deceleration test is subsequently executed. This is carried out, for example, using a torque sensor on the test object. An extrapolation for higher speeds is also necessary for measurements of this type. In addition, the measurements are only possible with specifically modified core assemblies or with core assemblies which actually allow a modification. It is additionally disadvantageous that the orbital path is distorted during the acceleration due to the coupling. Similarly, the generation of radial forces using nozzles may not be directly translated to actual operation.

The disadvantages of such known test benches, which have negative influences on the measured results, are, in summary, in particular, the altered mass inertia of the test object, e.g. due to necessary modifications; the rigid connection between drive and supercharger; and the fact that the results for high rotational speeds are not measured but may only be determined through interpolation.

One goal of the present invention is consequently the provision of a test bench which enables a high resolution measurement of the forces occurring in the bearing, in particular, in the region of the mixed friction of the Stribeck curves, under the most actual and influence-free conditions. Additional advantages of the invention will be described in the following.

SUMMARY OF THE INVENTION

The present invention relates to a test bench for measuring forces and torques of rotatably mounted bodies in charging devices according to claim 1.

The test bench according to the invention has a rotatably mounted body of a charging device, a measuring component, and a bearing device for mounting the measuring component. The bearing device is configured in such a way that the measuring component is frictionlessly mounted in the bearing device. Due to the frictionless mounting, distorting influences on the measured results are virtually eliminated. This leads to extremely exact measurements of the frictional forces and/or friction torques arising in the bearing(s) of the test object, and consequently to the friction losses detected with respect thereto. The forces and torques may thereby be directly measured and do not have to be calculated. The particular configuration of the test stand additionally enables a description of the transient friction behavior of the bearing in the test object in addition to the static behavior.

Frictionless mounting of the measuring component means, in this context, that only a negligible and very small air friction may arise. Thereby, a so-called breakaway torque caused by friction does not arise. Frictionless mounting of the measuring component in the bearing device may mean in this context, that frictional forces, which arise on the surface of the measuring component, are less than 1.0 N, preferably less than 0.5 N, most preferably less than 0.1 N, in particular, less than 0.01 N.

In the embodiments, the measuring component may be a measuring shaft which moves frictionlessly in the axial direction in the bearing device and may rotate around its longitudinal axis, in order to enable direct measuring of a friction torque and also an axial force. To achieve this, the bearing device may have an aerostatic air bearing. One advantage of this embodiment is that the virtual frictionless air mounting of the measuring component prevents the hysteresis and friction errors which affect and distort the results. The aerostatic air bearing may have at least three bearing seats, in particular, the air bearing may have, for example, seven bearing seats. These may, for example, be thereby arranged in assemblies of three and four at two axial positions around the measuring component. The bearing seats may have bearing pads. The bearing pads may thereby have porous surfaces. The porous surfaces may contain carbon. For example, the porous surface may have sintered graphite. With regard to the test bench, a bearing gap of several micrometers may be formed between the bearing device and the measuring component during operation. For example the bearing gap may be between 3 μm and 9 μm wide, in particular, between 5 μm and 7 μm wide. The bearing device may be driven using pressurized air. The pressures which are applied at the bearing device may lie between 2 bar and 10 bar, preferably between 4 bar and 6 bar.

In embodiments, which are combinable with all previously described embodiments, the test bench may have a friction torque measuring device, which is coupled to the measuring component in order to measure friction torques. The friction torque measuring device may be coupled to the measuring component in such a way that a rotation of the measuring component around the longitudinal axis of the measuring component is limited. The friction torque measuring device may have at least one load cell. In particular, the friction torque measuring device may have two load cells, for example, arranged on diametrically opposite sides of the measuring component. This enables a precise calibration of the test bench and a measurement of the friction torque in both directions. The load cell(s) may be arranged on one or more torque supports.

In embodiments, which are combinable with all previously described embodiments, the test bench may have an axial force measuring device which is coupled to the measuring component in order to measure axial forces which arise at the measuring component. The axial force measuring device may be coupled to the measuring component in such a way that an axial displacement of the measuring component along longitudinal axis of the measuring component is limited. Such an arrangement allows a direction measurement of the axial forces affecting the measuring component, for example, transmitted by a turbocharger core assembly. The axial force measuring device may have a strain gauge, by means of which the axial forces are measured. Furthermore, the axial force measuring device may have a bending beam on which the strain gauge is applied. The axial force measuring device may be configured so that it may be adjusted to the expected measuring forces. This may by implemented, for example, in that the bending beam may be adjusted or exchanged. The coupling between the measuring component and the axial force measuring device may be configured via a single contact point, which lies on the longitudinal axis of the measuring component. The measuring component may have a hardened surface in the region of the single contact point. Due to the contact at a single point and the hardened surface, an influence on the measurement, for example, due to arising friction, is largely prevented. The test bench may have an axial force control device, wherein measured values from the axial force measuring device function as a control parameter for the axial force control device. The axial force control device may be configured in such a way that a zero control of the axial forces is enabled. The friction torque measuring device and the axial force measuring device enable an independent measurement of the axial and radial forces and friction torques arising axially and radially in the bearing(s) of the test object and/or caused in the test object by the bearing(s).

In embodiments, which are combinable with all previously described embodiments, the test bench may have a turbocharger core assembly, which has the rotatably mounted body, wherein the turbocharger core assembly has a turbine wheel, a shaft, and a bearing unit comprising a bearing housing, wherein the bearing housing is connected to the measuring component. The rotatably mounted body may thereby comprise the shaft or the shaft together with the turbine wheel. During operation, the test object, that is, the core assembly, is driven via the turbine wheel as in actual operation. This has the advantage of complete speed adjustability from zero to the maximum speed of the test object. The turbocharger core assembly may additionally have an axial thrust disk which is arranged on the shaft instead of a compression wheel. In this case, the rotatably mounted body comprises the shaft, the turbine wheel, and the axial thrust disk. The axial thrust disk may be configured in such a way that the mass and the center of gravity of the axial thrust disk are identical to the mass and the center of gravity of a compressor wheel provided for normal operation in a vehicle. The inertia torque of the axial thrust disk may approximately correspond to the inertia torque of a compressor wheel provided for normal operation in a vehicle. In addition, a force application device may be provided for applying an axial force to the axial thrust disk. The force application device may apply the axial force, in particular, in both directions along the axis of the shaft. The force application device may have a pneumatic system, wherein the pneumatic systems is configured, in particular, in order to apply a compressive force on both sides of the axial thrust disk, by which means the axial force on the axial thrust disk, and thus on the shaft, is adjustable in both directions during operation of the test bench. Alternatively, the axial thrust disk may have ferritic material and the force application device may comprise an electromagnetic device with an electromagnet in order to apply axial force to the axial thrust disk. The force application device may function in conjunction with the axial force measuring device as part of an axial force control device which enables a controlled adjustment of the axial force. The force application device has the advantage that, during the measurement, the axial force affecting the test object or the shaft of the test object, and thus the bearing thereof, is completely variable in both directions along the axis of the test object shaft. This even enables a so-called zero control for the axial forces.

In embodiments, which are combinable with all previously described embodiments, the test bench may additionally have a turbine housing, wherein the turbine housing is oriented centered at the axis of rotation of the shaft, and wherein the turbine housing may be separated from the core assembly by a leakage gap, and thus is not in direct contact with the core assembly.

In embodiments, which are combinable with all previously described embodiments, the test bench has a first sensor unit for measuring the orbital path of the shaft. The first sensor unit may have at least two distance sensors. The two distance sensors may thereby be arranged in the region of a compressor-side end of the core assembly. The two distance sensors may be arranged relative to one another, in particular, at an angle between 90° and 100°, preferably at an angle between 92° and 97°, most preferably at an angle of 95°. The test bench may have a second sensor unit for measuring an axial movement of the shaft. The second sensor unit may have at least one distance sensor, wherein the distance sensor is arranged in the region of a turbine-side end. In particular, the distance sensor may be fixed on the turbine housing. The sensor units have the advantage that the rotor stability and the axial play of the test object may be documented during all measurements. Due to the avoidance of coupling elements (as the test object is not driven by an electromotor and therefore requires no coupling) and additional masses, the actual orbital path of the shaft of the charging device is not distorted.

In embodiments, which are combinable with all previously described embodiments, the test bench may be designed to measure a friction torque and an axial force directly at the measuring component. The test bench may be designed to operate at speeds greater than 250,000 rpm.

In embodiments, which are combinable with all previously described embodiments, the test bench may be designed such that series components of a core assembly of a turbocharger may be used, in particular, turbine wheel, shaft, and bearing unit comprising a bearing housing, and an oil circuit running therein.

The quality of the mounting of the shaft of a charging device depends greatly on the behavior in the mixed friction region of the Stribeck curves. Using the test bench according to the invention, an exact measurement of the forces arising in this region is possible for the first time. Thus, the signs of wear of the bearing may be better analyzed and evaluated. This is possible because both the spatial position (thus the axial displacement and displacement path/orbital path of the shaft) and the friction torque may be precisely determined under actual operating conditions and approximately without disturbance variables. These measured values in combination enable an exact evaluation of the behavior of the bearing in the mixed friction region. In addition, virtually unmodified core assemblies (the replacement of the compressor wheel being the exception) may be used for the test bench according to the invention. Thus, no modification of the oil circuit is necessary as well. Consequently, there is a complete variability and control or regulating function for all relevant lubricating oil parameters. In this way, the test bench according to the invention also enables a comparison of ball bearings and standard bearings (plain bearings) for charging devices, in particular, with respect to the behavior at low and very high speeds/rotational speeds.

Additional details and features of the invention will be described with reference to the following drawings:

DETAILED DESCRIPTION OF THE FIGURES

Figure 1:
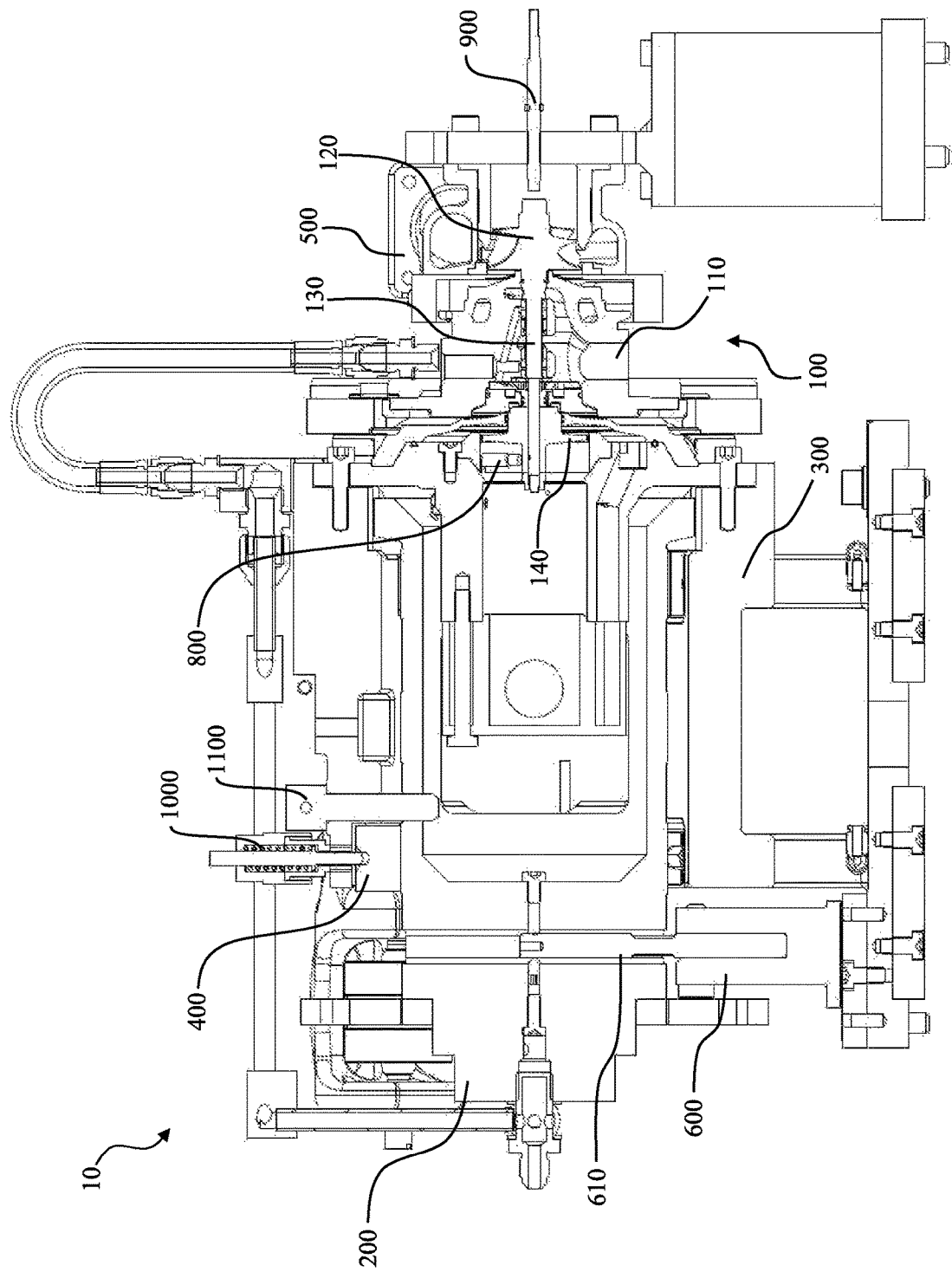
FIG. 1 shows a test bench according to the invention in longitudinal section according to one embodiment.

The test bench according to the invention is suitable for measuring forces and torques for charging devices of all types. An embodiment for measuring the bearing forces in a turbocharger will be subsequently described with the aid of the figures FIG. 1 shows a cutaway view of the test bench 10. The test bench has a rotatably mounted body for a charging device, a measurement component 200 in the form of a measuring shaft which is mounted in a bearing device 300. Bearing device 300 is configured in such a way that measuring shaft 200 is frictionlessly mounted. Due to the frictionless mounting, distorting influences on the measured results are virtually eliminated. This leads to highly precise measurements of the friction forces or friction torques arising in the bearings of the test object and, as a result, the friction losses determined therefrom. The forces and torques may thereby be directly measured and do not have to be calculated. The particular configuration of the test stand additionally enables a description of the transient friction behavior of the bearing in the test object as well as the static behavior.

Frictionless mounting of the measuring component or measuring shaft 200 means, in this context, that only a negligible and very low air friction may arise. A so-called breakaway torque caused by friction does not arise. Frictionless mounting of the measuring component or the measuring shaft in bearing device 300 may mean, in particular, that frictional forces, which arise on the surface of the measuring component of measuring shaft 200, are less than 1.0 N, preferably less than 0.5 N, most preferably less than 0.1 N, in particular, less than 0.01 N.

Furthermore, test bench 10, shown in FIG. 1, equipped for measurement operation, has a test object in the form of a turbocharger core assembly 100, which has the rotatably mounted body. Core assembly 100 comprises a turbine wheel 120, a shaft 130, and a bearing unit comprising a bearing housing 110, wherein bearing housing 110 is connected to measuring component 200. The rotatably mounted body may thereby comprise shaft 130 or shaft 130 together with turbine wheel 120. In addition, the rotatably mounted body may, e.g., also have a compressor wheel. In addition, test bench 10 has a turbine housing 500, wherein turbine housing 500 is oriented centered at the axis of rotation of shaft 130, and wherein turbine housing 500 is separated from core assembly 100 by a leakage gap and thus is not in direct contact with the core assembly. This means that core assembly 100 and measuring component 200 fixed thereon are completely decoupled from turbine housing 500.

In the embodiment of test bench 10 shown in FIG. 1, bearing device 300 is an aerostatic air bearing. This means that measuring component 200 is mounted in the test bench such that during operation of the test bench, it floats on the air bearing. One advantage of this type of mounting is that the virtual frictionless air mounting of measuring component 200 prevents the hysteresis and friction errors which affect and distort the results. The aerostatic air bearing has a specific number of bearing seats 400. The air bearing in the example shown has seven bearing seats 400. These are arranged in assemblies of three and four at two axial positions around measuring component 200 (offset from one another in a first bearing device region, for example, at 120° respectively and in a second bearing device region, for example, at 90° respectively). In FIG. 1, only one bearing seat 400 is apparent, as the remaining are covered or are not visible in the cutaway.

Bearing seats 400 have bearing pads. The bearing pads have a porous surface so that compressed air may flow through them. The porous surface may contain carbon. For example, the porous surface may have sintered graphite. When test bench 10 is operating, a bearing gap of several micrometers is formed between bearing device 300 or bearing seats 400 and measuring component 200. For example, the bearing gap may be between 3 µm and 9 µm wide, in particularly between 5 µm and 7 µm wide. Bearing device 300 operates using pressurized air. The pressures, which are applied at bearing device 300 or bearing seats 400, may lie between 2 bar and 10 bar, preferably between 4 bar and 6 bar. The pressure applied at the respective bearing seat 400 may be individually adjusted for each bearing seat 400. This is carried out during operation via a completely automated control. The bearing pads are coupled to a tensioning device 1000, via which they are pretensioned in the direction of measuring component 200. A clamping device 1000 with a spring is visible in FIG. 1. When compressed air is applied to bearing seats 400, bearing seats 400 move minimally against the spring force of clamping device 1000 in order to form the bearing gap.

Due to the design of the bearing arrangement, measuring shaft 200 may move frictionlessly in the axial direction in bearing device 300 and rotate around the longitudinal axis of the measuring device. This enables direct measurement of both a friction torque and also an axial force.

Figure 2:
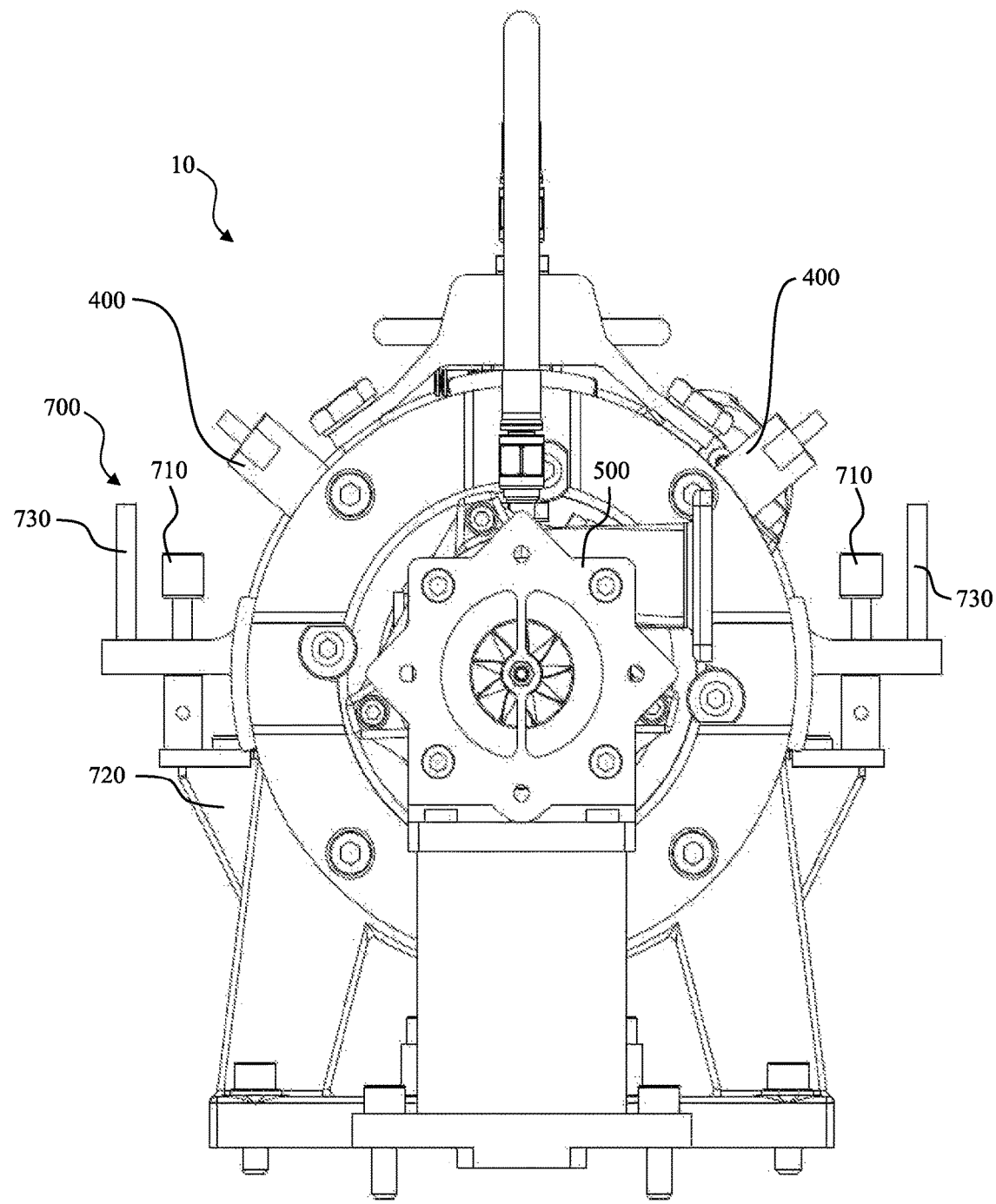
FIG. 2 shows a side view of the test bench according to the invention of the embodiment from FIG. 1.

As is particularly clear in FIG. 2, test bench 10 has a friction torque measuring device 700 which is coupled to measuring component 200 in order to measure friction torques. Friction torque measuring device 700 is thereby coupled to measuring component 200 in such a way that a rotation of measuring components 200 around the longitudinal axis thereof is limited. The surface of the measuring components may be hardened and/or smoothed at the coupling points (e.g., in the form of a point support) in order to prevent the influence of (frictional) forces at or through the coupling points. Friction torque measuring device 700 of the example shown in FIG. 2 has two load cells (710). These are able to carry out highly exact measurements with a resolution/accuracy in the range of 0.1 N. The friction torque and the friction power may be determined in conjunction with the known lever arm (distance of the measuring point of load cells 710 to the axis of measuring component 200) and the known rotational speed of shaft 130. The test bench is designed to document friction powers in the range from 0 to 3000 W. Two load cells 710 are arranged on diametrically opposite sides of measuring component 2000. This enables a precise calibration of the test bench and a measurement of the friction torque in both rotational directions. Two load cells 710 are arranged on one or more torque supports 720. As is apparent in FIG. 2, friction torque measuring device 700 additionally has corresponding receptacles 730 on each side for calibration weights. During the calibration of the test stand, receptacles 730 may be fitted with corresponding weights in order to precisely adjust friction torque measuring device 700.

Referring again to FIG. 1, the test bench has an axial force measuring device 600 which is coupled to measuring component 200. Axial force measuring device 600 functions for measuring axial forces which arise at measuring component 200. Axial force measuring device 600 is thereby coupled to measuring component 200 in such a way that an axial displacement of measuring component 200 along its longitudinal axis is limited. Such an arrangement allows a direct measurement of the axial forces, transmitted from turbocharger core assembly 100, and affecting measuring component 200. Axial force measuring device 600 has a bending beam 610. A strain gauge (not shown in the figures), with which the axial forces may be measured, is applied on bending beam 610. Axial force measuring device 600 may additionally be configured such that it may be adjusted to the expected measuring forces and to the size of core assembly 100 used. This may, for example, be implemented in that bending beam 610 is adjusted or exchanged. The coupling between measuring component 200 and axial force measuring device 600 is carried out via a single contact point which lies on the longitudinal axis of measuring component 200. In the region of this single contact point, measuring component 200 may have a hardened surface. Due to the contact at one single point in combination with the hardened surface, an influence, for example, by friction arising at the contact point, of the measurements by load cells 710 may be avoided. Test stand 10 may additionally have an axial force control device, wherein measured values from axial force measuring device 600 may function as a control parameter for the axial force control device. The axial force control device may thereby be configured in such a way that a zero control of the axial forces is possible. Friction torque measuring device 700 and axial force measuring device 600 enable an independent measurement of the axial and radial forces and friction torques arising radially or axially in the bearing(s) of the test object and/or caused in the test object by the bearing(s).

In order that the highly sensitive measuring devices (axial force measuring device 600 and friction torque measuring device 700) are not damaged during the installation or the exchange of core assembly 100, a removable bolt 1100 is provided which fixes the measuring components in the bearing device during installation or conversion work (see FIG. 1).

As described above, test bench 10 shown in FIG. 1 has turbocharger core assembly 100. Core assembly 100 comprises turbine wheel 120, shaft 130, and the bearing unit comprising bearing housing 110, wherein bearing housing 110 is connected to measuring component 200. During operation, the test object, that is, core assembly 100, is driven in actual operation via turbine wheel 120. Turbine wheel 120 itself is set into motion be an air flow. This has the advantage of complete speed adjustability from zero to a maximum speed in actual operation of the test object (thus, the charging device, for example, a core assembly of a turbocharger of the embodiment shown in the figures). Turbocharger core assembly 100 additionally has an axial thrust disk 140 which is arranged on shaft 130 instead of a compressor wheel. In this case, the rotatably mounted body comprises, for example, the shaft, the turbine wheel, and the axial thrust disk. Axial thrust disk 140 is thereby preferably configured in such a way that the mass and the center of gravity of axial thrust disk 140 are identical with the mass and the center of gravity of a compressor wheel provided for normal operation in the vehicle. The inertia torque of axial thrust disk 140 should approximately correspond to the inertia torque of a compressor wheel provided for normal operation. Test bench 10 additionally comprises a force application device for applying an axial force to axial thrust disk 140. The force application device is configured such that it may apply the axial force in both directions along the axis of shaft 130. This means that the force or the force vector on axial thrust disk 140 (and via the same on shaft 130) may run in the direction of the turbine-side end or in the opposite direction, parallel to the axis of the shaft. The force application device may have a pneumatic system, wherein the pneumatic system is configured, in particular, to apply a compression force on both sides of the axial thrust disk. By this means, the axial force on axial thrust disk 140, and via the same on shaft 130, is adjustable in both directions during operation of test bench 10. Alternatively, axial thrust disk 140 may have ferritic material and the force application device may comprise an electromagnetic device with an electromagnet in order to apply the axial force to axial thrust disk 140. The force application device functions in conjunction with the axial force measuring device as part of the above mentioned axial force control device, which enables a controlled adjustment of the axial force. The force application device has the advantage that, during the measurement, the axial force affecting the test body, or shaft 130 of the test body, and thus the bearings thereof, is completely variable in both directions along the axis of test body shaft 130. The force application device is able to apply controlled axial forces in the range from 0 to ±300 N on axial thrust disk 140 and thus on shaft 130. The control additionally enables a so-called zero control for the axial forces on the basis of the precise measurements and the force application device.

FIG. 1 additionally shows a first sensor unit of test bench 10 for measuring the orbital path of shaft 130. The first sensor unit has at least two distance sensors 800. The two distance sensors are arranged in the region of the compressor-side end of core assembly 100 (with regard to test bench 10, the end with axial thrust disk 140). The two distance sensors 800 (only one of the two distance sensors is visible in FIG. 1, as the other has been cut away) may be arranged relative to one another, in particular, at an angle between 90° and 100°, preferably at an angle between 92° and 97°, most preferably at an angle of 95°. Test bench 10 additionally has a second sensor unit for measuring an axial movement of shaft 130. The second sensor unit of the embodiment of test bench 10 shown in FIG. 1 has a distance sensor 900, wherein distance sensor 900 is arranged in the region of a turbine-side end of core assembly 100. Distance sensor 900 is fixed on turbine housing 500 and protrudes in the direction of core assembly 100. The sensor units with corresponding distance sensors 800, 900 have the advantage that the rotor stability and the axial play of the core assembly/test body may be documented during all measurements. Due to the avoidance of coupling elements (as the core group/test body are not driven by an electromotor and therefore no coupling is necessary) and additional masses, the actual orbital path of the shaft of the charging device (in the embodiment shown, of the core assembly of a turbocharger), is not distorted.

As already mentioned above, test bench 10 is designed in order to directly measure a friction torque and an axial force at measuring component 200. It is thereby possible to operate the charging device, in the example of test bench 10 shown in FIG. 1 and FIG. 2, core assembly 100 of a turbocharger, with rotational speeds achieved in actual operation. This means, test bench 10 is thereby designed to operate the core assembly or the rotating parts thereof (turbine wheel 120, shaft 130, and axial thrust disk 140) at speeds above 250,000 rpm. The described test bench 10 is thereby configured such that series components of a core assembly 100 of a turbocharger may be used, in particular, turbine wheel 120, shaft 130, and bearing unit with bearing housing 110, and an oil circuit running therein. Thus, no modification of the oil circuit is necessary and complete variability and control or regulating function is provided for all relevant lubricating oil parameters.

The invention claimed is:

1. A test bench (10) for measuring forces and torques of rotatably mounted bodies in charging devices, wherein test bench (10) has:
    a rotatably mounted body of a charging device,
    a measuring component (200), and
    a bearing component (300) for mounting the measuring component (200),
        wherein the bearing component (300) is configured in such a way that the measuring component (200) is frictionlessly mounted in the bearing component (300), and
        wherein the measuring component (200) is a measuring shaft which moves frictionlessly in the bearing component (300) in the axial direction and can rotate around the longitudinal axis of the shaft in order to enable direct measurements of both a friction torque and also an axial force.

2. The test bench according to claim 1, wherein the bearing component (300) has an aerostatic air bearing.

3. The test bench according claim 1, wherein a bearing gap between 3 μm and 9 μm wide is forming between the bearing component (300) and the measuring component (200) during operation.

4. The test bench according to claim 1, wherein the bearing component (300) is operated using pressurized air, wherein pressures between 2 bar and 10 bar are applied at the bearing component.

5. A test bench (10) for measuring forces and torques of rotatably mounted bodies in charging devices, wherein test bench (10) has:
    a rotatably mounted body of a charging device,
    a measuring component (200), and
    a bearing component (300) for mounting the measuring component (200),
wherein the bearing component (300) is configured in such a way that the measuring component (200) is frictionlessly mounted in the bearing component (300),
    wherein a friction torque measuring device (700) is coupled to the measuring component (200) in order to measure friction torques, wherein the friction torque measuring device (700) is coupled to the measuring component (200) in such a way that a rotation of the measuring component (200) around the longitudinal axis of the measuring component is limited.

6. The test bench according to claim 5, wherein the friction torque measuring device (700) has at least one load cell (710).

7. A test bench (10) for measuring forces and torques of rotatably mounted bodies in charging devices, wherein test bench (10) has:
    a rotatably mounted body of a charging device,
    a measuring component (200), and
    a bearing component (300) for mounting the measuring component (200),
wherein the bearing component (300) is configured in such a way that the measuring component (200) is frictionlessly mounted in the bearing component (300),
    comprising an axial force measuring device (600), which is coupled to the measuring component (200) in order to measure axial forces which arise at the measuring component (200),
wherein the axial force measuring device (600) is coupled to the measuring component (200) in such a way that an axial displacement of the measuring component (200) along the longitudinal axis of the measuring component is limited.

8. The test bench according to claim 7, wherein the axial force measuring device (600) has a strain gauge, with which the axial forces are measured.

9. The test bench according to claim 7, wherein the coupling between the measuring component (200) and the axial force measuring device (600) is configured via a single contact point, which lies on the longitudinal axis of the measuring component (200).

10. The test bench according to claim 1, comprising a turbocharger core assembly (100), which has a rotatably mounted body, wherein the turbocharger core assembly has a turbine wheel (120), a shaft (130), and a bearing unit comprising a bearing housing (110), wherein the bearing housing (110) is connected to the measuring component (200).

11. A test bench (10) for measuring forces and torques of rotatably mounted bodies in charging devices, wherein test bench (10) has:
    a rotatably mounted body of a charging device,
    a measuring component (200), and a bearing component (300) for mounting the measuring component (200), wherein the bearing component (300) is configured in such a way that the measuring component (200) is frictionlessly mounted in the bearing component (300), comprising a turbocharger core assembly (100), which has a rotatably mounted body, wherein the turbocharger core assembly has a turbine wheel (120), a shaft (130), and a bearing unit comprising a bearing housing (110), wherein the bearing housing (110) is connected to the measuring component (200), wherein the turbocharger core assembly additionally has an axial thrust disk (140) which is arranged on the shaft (130) to simulate a compressor wheel, wherein the axial thrust disk (140) is configured in such a way that the mass and the center of gravity of the axial thrust disk (140) are identical with the mass and the center of gravity of a compressor wheel provided for normal operation in a vehicle.

12. The test bench according to claim 10, wherein the test bench additionally has a turbine housing (500), wherein the turbine housing (500) is oriented centered at the rotational axis of the shaft (130), and wherein the turbine housing (500) is separated from the turbocharger core assembly (100) by a leakage gap and thus is not in direct contact with the turbocharger core assembly (100).

13. A test bench (10) for measuring forces and torques of rotatably mounted bodies in charging devices, wherein test bench (10) has:

a rotatably mounted body of a charging device,
a measuring component (200), and
a bearing component (300) for mounting the measuring component (200), wherein the bearing component (300) is configured in such a way that the measuring component (200) is frictionlessly mounted in the bearing component (300), wherein the test bench (10) has at least one of a first sensor unit (800) for measuring the orbital path of the shaft (130) and a second sensor unit (900) for measuring an axial movement of the shaft (130).

14. The test bench according to claim 13, wherein the first sensor unit (800) has at least two distance sensors wherein the two distance sensors are arranged in the region of a compressor-side end of the turbocharger core assembly (100), wherein the two distances sensors are arranged with respect to one another at an angle between 90° and 100°.

15. The test bench according to claim 13, wherein the second sensor unit (900) has at least one distance sensor, wherein the distance sensor is arranged in the region of a turbine-side end, in particular wherein the distance sensor is fixed on the turbine housing (500).

16. A test bench (10) for measuring forces and torques of rotatably mounted bodies in charging devices, wherein test bench (10) has:

a rotatably mounted body of a charging device,
a measuring component (200), and
a bearing component (300) for mounting the measuring component (200), wherein the bearing component (300) is configured in such a way that the measuring component (200) is frictionlessly mounted in the bearing component (300), wherein the test bench (10) is designed to directly measure a friction torque and an axial force at the measuring component (200).

17. A test bench (10) for measuring forces and torques of rotatably mounted bodies in charging devices, wherein test bench (10) has:

a rotatably mounted body of a charging device,
a measuring component (200), and
a bearing component (300) for mounting the measuring component (200), wherein the bearing component (300) is configured in such a way that the measuring component (200) is frictionlessly mounted in the bearing component (300), wherein series components of a turbocharger core assembly (100) of a turbocharger are used, including a turbine wheel (120), a shaft (130), and a bearing unit with a bearing housing (110), and an oil circuit running therein.

18. The test bench according to claim 1, wherein frictionless mounting of the measuring component (200) in the bearing component (300) means that frictional forces, which arise at the surface of the measuring component (200), are smaller than 1.0 N.

* * * * *